(12) United States Patent
Evans et al.

(10) Patent No.: US 8,000,474 B1
(45) Date of Patent: Aug. 16, 2011

(54) CLIENT-SIDE PROTECTION OF BROADCAST OR MULTICAST CONTENT FOR NON-REAL-TIME PLAYBACK

(75) Inventors: Gregory Morgan Evans, Raleigh, NC (US); Thomas A. Roberts, Fuquay-Varina, NC (US)

(73) Assignee: Quiro Holdings, Inc., Raleigh, NC (US)

( * ) Notice: Subject to any disclaimer, the term of this patent is extended or adjusted under 35 U.S.C. 154(b) by 1121 days.

(21) Appl. No.: 11/611,188

(22) Filed: Dec. 15, 2006

(51) Int. Cl.
*H04L 9/00* (2006.01)
(52) U.S. Cl. ......................................... 380/205; 380/200
(58) Field of Classification Search ........... 380/200–217
See application file for complete search history.

(56) References Cited

U.S. PATENT DOCUMENTS

| | | | |
|---|---|---|---|
| 5,613,004 A | 3/1997 | Cooperman et al. |
| 5,687,236 A | 11/1997 | Moskowitz et al. |
| 5,758,257 A | 5/1998 | Herz et al. |
| 5,790,935 A | 8/1998 | Payton |
| 5,809,139 A | 9/1998 | Girod et al. |
| 5,905,800 A | 5/1999 | Moskowitz et al. |
| 6,141,753 A | 10/2000 | Zhao et al. |
| 6,282,299 B1 | 8/2001 | Tewfik et al. |
| 6,389,541 B1 | 5/2002 | Patterson |
| 6,510,234 B1 | 1/2003 | Cox et al. |
| 6,567,107 B1 | 5/2003 | Stannard |
| 6,721,282 B2 | 4/2004 | Motley |
| 6,735,699 B1 | 5/2004 | Sasaki et al. |
| 6,738,493 B1 | 5/2004 | Cox et al. |
| 6,751,670 B1 | 6/2004 | Patterson |
| 6,774,926 B1 | 8/2004 | Ellis et al. |
| 6,804,779 B1 | 10/2004 | Carroni et al. |
| 6,975,743 B2 | 12/2005 | Venkatesan et al. |
| 6,980,204 B1 | 12/2005 | Hawkins et al. |
| 6,987,985 B2 | 1/2006 | Purkayastha et al. |
| 7,003,131 B2 | 2/2006 | Watson et al. |
| 7,016,668 B2 | 3/2006 | Vaidyanathan et al. |

(Continued)

FOREIGN PATENT DOCUMENTS

GB 2306869 A 5/1997

(Continued)

OTHER PUBLICATIONS

U.S. Appl. No. 60/831,767 to Candelore, filed Jul. 18, 2006.*

(Continued)

*Primary Examiner* — Nasser Moazzami
*Assistant Examiner* — Lisa Lewis
(74) *Attorney, Agent, or Firm* — Withrow & Terranova, PLLC (57) ABSTRACT

A system and method are disclosed for providing client-side protection of broadcast or multicast multimedia content for non-real-time playback. A set-top box function receives a request to record multimedia content and determines whether recording of the multimedia content is restricted. Upon receiving the multimedia content, the set-top box decrypts the multimedia content for real-time playback. If recording of the multimedia content is restricted, the set-top box re-encrypts the multimedia content and generates a packaged file including the re-encrypted multimedia content and one or more of a content identifier, a set-top identifier, a network reference to a copyright policy server, and a record policy of the multimedia content. The packaged file is either stored locally or transferred to remote storage. A remote system having access to the packaged file obtains the packaged file and enforces a copyright policy of the multimedia content before releasing the multimedia content for non-real-time playback.

29 Claims, 4 Drawing Sheets

U.S. PATENT DOCUMENTS

| | | |
|---|---|---|
| 7,020,304 B2 | 3/2006 | Alattar et al. |
| 7,036,024 B2 | 4/2006 | Watson |
| 7,065,607 B2 | 6/2006 | England et al. |
| 7,069,580 B1 | 6/2006 | Deitz et al. |
| 7,167,599 B1 | 1/2007 | Diehl |
| 7,242,766 B1 | 7/2007 | Lyle |
| 7,369,677 B2 | 5/2008 | Petrovic et al. |
| 7,409,556 B2 | 8/2008 | Wu et al. |
| 7,415,617 B2 | 8/2008 | Ginter et al. |
| 7,562,397 B1 | 7/2009 | Mithal et al. |
| 2001/0051996 A1 | 12/2001 | Cooper et al. |
| 2002/0010759 A1 | 1/2002 | Hitson et al. |
| 2002/0013812 A1 | 1/2002 | Krueger et al. |
| 2002/0049580 A1 | 4/2002 | Kutaragi et al. |
| 2002/0054578 A1 | 5/2002 | Zhang et al. |
| 2002/0057799 A1 | 5/2002 | Kohno |
| 2002/0061029 A1 | 5/2002 | Dillon |
| 2002/0104003 A1 | 8/2002 | Iwamura |
| 2002/0104099 A1 | 8/2002 | Novak |
| 2002/0122141 A1 | 9/2002 | Lee |
| 2002/0129367 A1 | 9/2002 | Devara |
| 2002/0141578 A1 | 10/2002 | Ripley et al. |
| 2002/0144267 A1 | 10/2002 | Gutta et al. |
| 2002/0156842 A1 | 10/2002 | Signes et al. |
| 2002/0168082 A1 | 11/2002 | Razdan |
| 2002/0172395 A1 | 11/2002 | Foote et al. |
| 2003/0009769 A1* | 1/2003 | Hensgen et al. ............... 725/131 |
| 2003/0012403 A1 | 1/2003 | Rhoads et al. |
| 2003/0050055 A1 | 3/2003 | Ting et al. |
| 2003/0081580 A1 | 5/2003 | Vaidyanathan et al. |
| 2003/0093665 A1 | 5/2003 | Cooper et al. |
| 2003/0138127 A1 | 7/2003 | Miller et al. |
| 2003/0152096 A1 | 8/2003 | Chapman |
| 2003/0161268 A1 | 8/2003 | Larsson et al. |
| 2003/0191850 A1 | 10/2003 | Thornton |
| 2004/0008864 A1 | 1/2004 | Watson et al. |
| 2004/0010692 A1 | 1/2004 | Watson |
| 2004/0010694 A1 | 1/2004 | Collens et al. |
| 2004/0030798 A1 | 2/2004 | Andersson et al. |
| 2004/0042421 A1 | 3/2004 | Mahany |
| 2004/0049787 A1 | 3/2004 | Maissel et al. |
| 2004/0070593 A1 | 4/2004 | Neely et al. |
| 2004/0073916 A1 | 4/2004 | Petrovic et al. |
| 2004/0083487 A1 | 4/2004 | Collens et al. |
| 2004/0086122 A1 | 5/2004 | Watson |
| 2004/0088549 A1 | 5/2004 | Ukai et al. |
| 2004/0088557 A1 | 5/2004 | Malcolm et al. |
| 2004/0117824 A1 | 6/2004 | Karaoguz et al. |
| 2004/0131184 A1 | 7/2004 | Wu et al. |
| 2004/0139047 A1 | 7/2004 | Rechsteiner et al. |
| 2004/0156528 A1 | 8/2004 | Joo et al. |
| 2004/0187005 A1 | 9/2004 | Molaro |
| 2004/0234099 A1 | 11/2004 | Venkatesan et al. |
| 2004/0248615 A1 | 12/2004 | Purkayastha et al. |
| 2004/0263941 A1 | 12/2004 | Chen et al. |
| 2004/0264372 A1 | 12/2004 | Huang |
| 2005/0008017 A1 | 1/2005 | Datta et al. |
| 2005/0034001 A1 | 2/2005 | Pontarelli |
| 2005/0050103 A1 | 3/2005 | Kesteloot et al. |
| 2005/0081042 A1 | 4/2005 | Venkatesan et al. |
| 2005/0086069 A1 | 4/2005 | Watson et al. |
| 2005/0097331 A1 | 5/2005 | Majidimehr et al. |
| 2005/0108769 A1 | 5/2005 | Arnold et al. |
| 2005/0120127 A1 | 6/2005 | Bradley et al. |
| 2005/0123135 A1 | 6/2005 | Hunt et al. |
| 2005/0125405 A1 | 6/2005 | Watson et al. |
| 2005/0144468 A1 | 6/2005 | Northcutt et al. |
| 2005/0169632 A1 | 8/2005 | Song et al. |
| 2005/0182876 A1 | 8/2005 | Kim et al. |
| 2005/0182989 A1 | 8/2005 | Zarnke et al. |
| 2005/0183120 A1 | 8/2005 | Jain et al. |
| 2005/0192987 A1 | 9/2005 | Marsh |
| 2005/0201340 A1 | 9/2005 | Wang et al. |
| 2005/0201726 A1 | 9/2005 | Malcolm et al. |
| 2005/0216942 A1 | 9/2005 | Barton |
| 2005/0220321 A1 | 10/2005 | Langelaar |
| 2005/0239497 A1 | 10/2005 | Bahl et al. |
| 2005/0251486 A1 | 11/2005 | Nair |
| 2005/0286438 A1 | 12/2005 | Rajkotia |
| 2006/0010274 A1 | 1/2006 | Olson |
| 2006/0015735 A1 | 1/2006 | Kudo et al. |
| 2006/0047967 A1 | 3/2006 | Akhan et al. |
| 2006/0048185 A1 | 3/2006 | Alterman |
| 2006/0048186 A1 | 3/2006 | Alterman |
| 2006/0050880 A1 | 3/2006 | Taylor et al. |
| 2006/0053452 A1 | 3/2006 | Lee et al. |
| 2006/0053472 A1 | 3/2006 | Goto et al. |
| 2006/0056349 A1 | 3/2006 | Nakatugawa et al. |
| 2006/0059560 A1 | 3/2006 | Montulli |
| 2006/0072786 A1 | 4/2006 | Watson et al. |
| 2006/0075243 A1 | 4/2006 | Lakamp et al. |
| 2006/0080707 A1 | 4/2006 | Laksono |
| 2006/0085534 A1 | 4/2006 | Ralston et al. |
| 2006/0085830 A1 | 4/2006 | Bruck et al. |
| 2006/0095401 A1 | 5/2006 | Krikorian et al. |
| 2006/0095471 A1 | 5/2006 | Krikorian et al. |
| 2006/0095472 A1 | 5/2006 | Krikorian et al. |
| 2006/0095792 A1 | 5/2006 | Hurtado et al. |
| 2006/0123235 A1 | 6/2006 | Vanstone |
| 2006/0126888 A1 | 6/2006 | Talstra et al. |
| 2006/0127037 A1 | 6/2006 | Van Hoff et al. |
| 2006/0129672 A1 | 6/2006 | Mayer |
| 2006/0133644 A1 | 6/2006 | Wells et al. |
| 2006/0156003 A1 | 7/2006 | Zhang et al. |
| 2006/0156416 A1 | 7/2006 | Huotari et al. |
| 2006/0158968 A1 | 7/2006 | Vanman et al. |
| 2006/0161776 A1 | 7/2006 | Van Der Veen et al. |
| 2006/0165169 A1 | 7/2006 | Ng et al. |
| 2006/0173794 A1 | 8/2006 | Sellars et al. |
| 2006/0174128 A1 | 8/2006 | Yuval |
| 2006/0193492 A1 | 8/2006 | Kuzmich et al. |
| 2006/0200416 A1 | 9/2006 | White et al. |
| 2006/0206933 A1 | 9/2006 | Molen et al. |
| 2007/0002742 A1 | 1/2007 | Krishnaswamy et al. |
| 2007/0056046 A1 | 3/2007 | Claudatos et al. |
| 2007/0061488 A1 | 3/2007 | Alagappan et al. |
| 2007/0061580 A1 | 3/2007 | Venkatesan et al. |
| 2007/0100771 A1 | 5/2007 | Eckleder et al. |
| 2007/0124474 A1 | 5/2007 | Margulis |
| 2007/0130585 A1 | 6/2007 | Perret et al. |
| 2007/0133673 A1* | 6/2007 | Imaizumi ...................... 375/240 |
| 2007/0269044 A1 | 11/2007 | Bruestle et al. |
| 2008/0005676 A1 | 1/2008 | Evans et al. |
| 2008/0044087 A1* | 2/2008 | Levy et al. .................... 382/232 |
| 2008/0148063 A1 | 6/2008 | Hanko et al. |
| 2009/0037388 A1* | 2/2009 | Cooper et al. .................... 707/3 |
| 2009/0287837 A1* | 11/2009 | Felsher ........................ 709/229 |
| 2009/0287940 A1 | 11/2009 | Carr |

FOREIGN PATENT DOCUMENTS

| | | | |
|---|---|---|---|
| WO | WO 00/40021 A1 | | 7/2000 |
| WO | WO 2005/045647 A2 | | 5/2005 |
| WO | WO 2006046099 | * | 5/2006 |

OTHER PUBLICATIONS

E. Setton, T. Yoo, X. Zhu, A. Goldsmith, and B. Girod, "Cross-Layer Design of Ad Hoc Networks for Real-Time Video Streaming," IEEE Wireless Communications, vol. 12, issue 4, pp. 99-102, Aug. 2005.
PC Connection, http://www.pcconnection.com/ProductDetail?sku=5373172&SourceID=k40132, 2006.
Vijay T. Raisinghani et al., "ECLAIR: An Efficient Cross Layer Architecture for Wireless Protocol Stacks," 5th World Wireless Congress, San Francisco, CA, May 25-28, 2004.
Vineet Srivastava et al., "Cross-Layer Design: A Survey and the Road Ahead," IEEE Communications Magazine, pp. 112-119, Dec. 2005.
Jana Dittmann et al., "Robust MPEG Video Watermarking Technologies," 1998.
Paul Judge and Mostafa Ammar, "WHIM: Watermarking Multicast Video with a Hierarchy of Intermediates," Computer Networks: The International Journal of Computer and Telecommunications Networking archive, 2002, pp. 699-712, vol. 39, Issue 6.
E. Koch and J. Zhao, "Towards Robust and Hidden Image Copyright Labeling," IEEE Workshop on Nonlinear Signal and Image Processing, 1995, pp. 452-455.

Jiri Fridrich, "Applications of Data Hiding in Digital Images," Tutorial for the ISPACS '98 Conference in Melbourne, Australia, Nov. 4-6, 1998.

Jiri Fridrich, "Methods for data hiding," (working paper), 1997, 33 pages, Center for Intelligent Systems & Department of Systems Science and Industrial Engineering, SUNY Binghamton, http://74.125.47.132/search?q=cache: unDoOhDSrQYJ:www.ws.binghamton.edu/fridrich/Research/meth_ps.ps+Fridrich+Methods+for+Data+Hiding&hl=en&ct=clnk&cd=5&gl=us.

No Author, "Gefen HDMI Cat-5 Extreme User Manual," (manual), 2006, 16 pages, Gefen Inc.

No Author, "Global-Link Product Manual Rev. C—Jan. 2005," (manual), Jan. 2005, 68 pages, Logical Solutions, http://www.thinklogical.com/documents/Global-Link_Manual_Rev_C.pdf.

No Author, "XTENDEX HDTV Extender," (website), 2005, 2 pages, http://www.networktechinc.com/pdf/cat-hdtv-extend.pdf.

No Author, "Get the eye, get Purelink," (website), obtained Jul. 13, 2007, 2 pages, http://www.dtrovision.com.

No Author, "Secure KVM over IP: Global-link—Thinklogical," (website), obtained Jul. 13, 2007, 1 page, http://www.thinklogical.com/products/globalLink.php.

No Author, "XTENDEX Series ST-C5DVI-150, 150 Foot DVI Video Extender Installation and Operation Manual Software Version 1.2," (manual), Oct. 4, 2006, 11 pages, http://www.networktechinc.com/pdf/man063.pdf.

No Author, "MediaMax Axonix Corporation," (website), obtained Jul. 13, 2007, 2 pages, http://www.axonix.com/mediamax/.

No Author, "Kaleidescape—Home," (website), obtained Jul. 13, 2007, 1 page, http://www.kaleidescape.com.

Jim Lyle, "HDCP: what it is and how to use it," (article), Apr. 18, 2002, pp. 73-81, Electronics Design Strategy News, http://www.edn.com/article/ca209091.html?q=&q=HDCP.

No Author, "DVI Extender CAT5," (website), obtained Jul. 13, 2007, 2 pages, http://www.networktechinc.com/cat5-dvi.html.

No Author, "KVM over IP Extender—Logical Solutions," (website), obtained Nov. 1, 2006, 3 pages, http://www.kvmpro.com/thinklogical-kvm-extnders-dvi-global-link-p-202.html.

No Author, "KVMPro—KVM Switch, Avocent KVM over IP," (website), obtained Nov. 1, 2006, 4 pages, http://www.kvmpro.com/dvi-extender-c-38.html.

No Author, "The DVI CAT5 Extender, (EXT-DVI-CAT5)," (website), obtained Nov. 1, 2006, 3 pages, http://www.kvmpro.com/gefen-kvm-extenders-dvi-the-dvi-cat5-extender-p-214.html.

No Author, "The DVI 1000 HD (EXT-DVI-1000)," (website), obtained Nov. 1, 2006, 2 pages, http://www.kvmpro.com/gefen-kvm-extenders-dvi-the-dvi-1000-hd-p-213.html.

No Author, "Remote Access to USB Devices," (website), obtained Nov. 1, 2006, 2 pages, http://www.networktechnic.com/usb-ip-extender.html.

No Author, "USB KVM Extender copper CAT5 RJ45," (website), obtained Nov. 1, 2006, 3 pages, http://www.networktechnic.com/extenders.html.

No Author, "High-bandwidth Digital Content Protection System," Digital Content Production LLC, Revision 1.3, Dec. 21, 2006, pp. 1-20.

No Author, "PureLink Digital Extender User Manual", Dtrovision LLC, 2006, 9 pages.

\* cited by examiner

CLIENT-SIDE PROTECTION OF BROADCAST OR MULTICAST CONTENT FOR NON-REAL-TIME PLAYBACK

FIELD OF THE INVENTION

The present invention relates to a set-top box function that receives broadcast or multicast multimedia content and enables client-side protection of the multimedia content for non-real-time playback.

BACKGROUND OF THE INVENTION

In a broadcast/multicast (one-to-many) video transport system, digital watermarking can most easily be accomplished at the source of the video broadcast. This approach delivers a common watermark to each termination or client receiving the broadcast or multicast video content. However, this common watermark provides no deterrent to the user against anonymous redistributions. This redistribution can occur through public Peer-to-Peer (P2P) networks, darknets, or postings to video sharing sites.

Client-side watermarking may be used to address this issue. More specifically, client-side watermarking may be used to watermark broadcast or multicast content with information clearly identifying the end user or client device. This watermark then serves to deter the end user from violating the copyright policy by illegally redistributing the video content. However, client-side watermarking requires substantial resources and, therefore, significantly increases the cost of the client device. As such, there is a need for a low cost system providing client-side protection of broadcast or multicast content.

SUMMARY OF THE INVENTION

The present invention relates to client-side protection of broadcast or multicast multimedia content for non-real-time playback. A set-top box function receives a request to record multimedia content and determines whether recording of the multimedia content is restricted. Upon receiving the multimedia content, the set-top box decrypts the multimedia content, if necessary, for real-time playback. If recording of the multimedia content is restricted, the set-top box re-encrypts the multimedia content and generates a packaged file including the re-encrypted multimedia content and one or more of a content identifier, a set-top identifier, a network reference to a copyright policy server, and a record policy of the multimedia content. The packaged file is either stored locally or transferred to remote storage. A remote system having access to the packaged file obtains the packaged file and enforces a copyright policy of the multimedia content before releasing the multimedia content for non-real-time playback. For example, the copyright policy may require that the multimedia content be watermarked with a content identifier, a set-top identifier, and/or user information identifying an associated user, that a desired Digital Rights Management (DRM) policy be enforced, that the user purchase the multimedia content, or that the user pay a fee for non-real-time access to the multimedia content.

Those skilled in the art will appreciate the scope of the present invention and realize additional aspects thereof after reading the following detailed description of the preferred embodiments in association with the accompanying drawing figures.

BRIEF DESCRIPTION OF THE DRAWING FIGURES

The accompanying drawing figures incorporated in and forming a part of this specification illustrate several aspects of the invention, and together with the description serve to explain the principles of the invention.

DETAILED DESCRIPTION OF THE PREFERRED EMBODIMENTS

The embodiments set forth below represent the necessary information to enable those skilled in the art to practice the invention and illustrate the best mode of practicing the invention. Upon reading the following description in light of the accompanying drawing figures, those skilled in the art will understand the concepts of the invention and will recognize applications of these concepts not particularly addressed herein. It should be understood that these concepts and applications fall within the scope of the disclosure and the accompanying claims.

Figure 1:
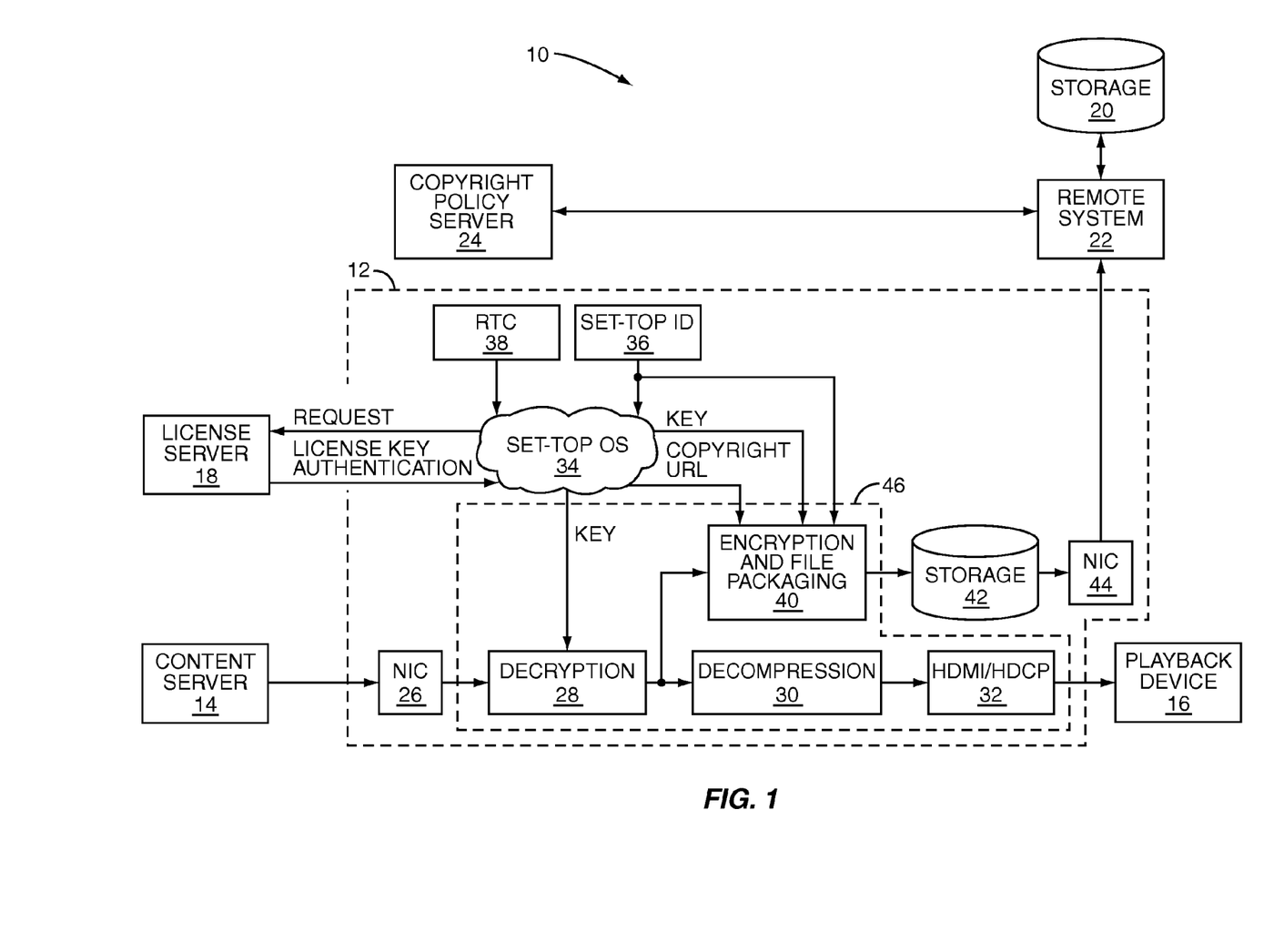
FIG. 1 illustrates a system incorporating a set-top box function providing client-side protection of broadcast or multicast multimedia content for non-real-time playback according to one embodiment of the present invention.

FIG. 1 illustrates a system 10 including a set-top box function 12 implementing the present invention. In general, the system 10 includes the set-top box function 12, a content server 14, a playback device 16, a license server 18, remote storage 20, a remote system 22, and a copyright policy server 24. Note that one or more of the content server 14, the license server 18, and the copyright policy server 24 may alternatively be implemented on the same server. In general, the set-top box function 12 receives multimedia content from the content server 14. The content server 14 may broadcast or multicast the multimedia content to a number of set-top box functions including the set-top box function 12 in a one-to-many fashion using, for example, Internet Protocol version 4 (IPv4), Internet Protocol version 6 (IPv6), or digital television broadcast such as a Cable Television (CATV) or satellite broadcast. In one embodiment, the content server 14 is an Internet Protocol Television (IPTV) server providing an IPTV service. The multimedia content received by the set-top box function 12 is preferably encrypted. In addition, the multimedia content may be encoded or compressed according to, for example, the MPEG2, MPEG4, H.264, or other standardized or proprietary protocol.

The set-top box function 12 then decrypts and optionally decompresses the multimedia content from the content server 14 and provides the decrypted, decompressed multimedia content to the playback device 16 for real-time playback. The playback device 16 may be, for example, a High Definition Multimedia Interface (HDMI)/High-bandwidth Digital Content Protection (HDCP) compliant television or the like. Note that while the discussion herein focuses on HDMI/HDCP as the preferred embodiment, the present invention is not limited thereto. The present invention is equally applicable to any digital multimedia output interface and associated Digital Rights Management (DRM) scheme. In addition, as discussed below in detail, if recording of the multimedia content is restricted, the set-top box function 12 re-encrypts the decrypted multimedia content using an encryption key obtained from the license server 18 and generates a packaged file including the re-encrypted multimedia content and one or more of a content identifier (ID) identifying the multimedia content, a set-top ID identifying the set-top box function 12, a Uniform Resource Locator (URL) or other reference to the copyright policy server 24, and a record policy for the multimedia content obtained from the license server 18. The set-top box function 12 then stores the packaged file either locally where the remote system 22 has access to the packaged file or remotely in the remote storage 20 associated with the remote system 22.

The remote system 22 may be a personal computer, multimedia center, Digital Video Recorder (DVR), portable media device, or the like connected to the set-top box function 12 via, for example, a Local Area Network (LAN). For example, the remote system 22 may be a personal computer connected to the set-top box function 12 via a LAN in an associated user's home. Using the URL of the copyright policy server 24, the remote system 22 then interacts with the copyright policy server 24 to obtain and enforce a copyright policy of the multimedia content. Note that the copyright policy server 24 is more generally referred to herein as a rights policy server. Likewise, the copyright policy is more generally referred to herein as a rights policy. The copyright policy for the multimedia content may be defined by the owner of the multimedia content, a broadcaster of the multimedia content, or the like. As discussed below, the manner in which the copyright policy is enforced depends on the details of the copyright policy. The copyright policy may require client-side watermarking of the multimedia content with the set-top ID of the set-top box function 12, the content ID of the multimedia content, and/or user specific information. As another example, the copyright policy may require that a desired Digital Rights Management (DRM) policy be enforced.

The present invention enables enforcement of a copyright policy for recorded multimedia content while keeping the set-top box function 12 relatively low-cost. More specifically, the set-top box function 12 generates a packaged file including the re-encrypted multimedia content and makes the packaged file accessible to the remote system 22. The remote system 22, rather than the set-top box function 12, then enforces the copyright policy by, for example, watermarking the multimedia content before releasing the multimedia content to the user in non-real-time. As such, client-side protection may be enforced by the remote system 22, which may be the user's personal computer, rather than the set-top box function 12. As a result, the cost of the set-top box function 12 is substantially reduced.

The set-top box function 12 is preferably a set-top box such as a digital cable television set-top box or an IPTV set-top box, or a sub-system of a set-top box such as a digital cable television or IPTV decoder. However, the present invention is not limited thereto. The set-top box function 12 may alternatively be a hardware and/or software function stored on a personal computer or the like.

In this embodiment, the set-top box function 12 includes a network interface (NIC) 26 for receiving the multimedia content from the content server 14. The network interface 26 may be a network interface card, digital television tuner, or the like enabling the set-top box function 12 to either tune to a desired broadcast channel or subscribe to a desired multicast channel.

In this example, the multimedia content from the content server 14 is encrypted and compressed, or encoded, according to the MPEG2 standard, the MPEG4 standard, the H.264 standard, or some other standardized or proprietary compression technique.

A decryption function 28 operates to decrypt the multimedia content using a known key. Note that the key may be obtained from the content server 14 or an associated authentication system. A decompression function 30 decompresses the decrypted multimedia content. The multimedia content may then be provided to the playback device 16 for real-time playback via a secure digital interface, which in this example is an HDMI/HDCP interface 32. Again, note that while the discussion herein focuses on HDMI/HDCP as the preferred embodiment, the present invention is not limited thereto. The present invention is equally applicable to any digital multimedia output interface and associated Digital Rights Management (DRM) scheme. The HDMI/HDCP interface 32 ensures that the playback device 16 is an HDCP complaint device before providing the decrypted, decompressed multimedia content to the playback device 16 in order to prevent the decrypted, decompressed multimedia content from being recorded by an unauthorized device such as a non-complaint DVD recorder, personal computer, or DVR.

According to the present invention, when the multimedia content is desired to be recorded, an operating system 34, or control system, of the set-top box function 12 determines whether recording of the multimedia content is restricted. For example, if the multimedia content desired to be recorded is an episode of "The Office," the operating system 34 determines whether recording of the episode or recording of the series "The Office" is restricted. The operating system 34 may determine whether recording is restricted by, for example, examining a broadcast flag within the multimedia content or sending a request to the license server 18. Alternatively, metadata describing the multimedia content such as the metadata included within an Electronic Programming Guide (EPG) may include information identifying whether recording is restricted.

If recording is restricted, the operating system 34 sends a request to the license server 18. The request may include the content ID of the multimedia content and a set-top ID 36 of the set-top box function 12. The content ID may be some identifier of the multimedia content provided by the content server 14. For example, the content ID may include information describing the multimedia content such as the title of the multimedia content obtained from the EPG based on clock information from a Real Time Clock (RTC) 38. The set-top ID 36 may be an identifier such as, for example, a serial number of the set-top box function 12, and may be used by the license server 18 to determine whether the set-top box function 12 is permitted to record the multimedia content for non-real-time playback in the manner described below.

In response to the request, the license server 18 returns an encryption key to be used to re-encrypt the multimedia content and optionally the URL of the copyright policy server 24 and a record policy for the multimedia content. The encryption key may be, for example, unique to the set-top box function 12, unique to the multimedia content, or unique to combination of the set-top box function 12 and the multimedia content. As discussed below, the URL of the copyright policy server 24 may later be used by the remote system 22 to contact the copyright policy server 24. The record policy may include advance information regarding the steps that will be necessary to obtain non-real-time access to the multimedia content. For example, the record policy may include information stating that the user will be required to purchase the multimedia content or pay a fee before non-real-time access is permitted, information indicating that client-side watermarking will be required, or information describing a DRM policy for the multimedia content.

An encryption and file packaging function 40 re-encrypts the multimedia content using the encryption key obtained from the license server 18 and generates the packaged file including the re-encrypted multimedia content. The packaged multimedia file also includes one or more of the content ID, the set-top ID 36, the URL of the copyright policy server 24, and the record policy for the multimedia content. In one embodiment, the packaged multimedia file is stored in local storage 42 and may be thereafter accessed by the remote system 22. The local storage 42 may be, for example, one or more hard disc drives, internal or removable memory, or the like. In another embodiment, the packaged multimedia file is transferred to the remote system 22 via a network interface (NIC) 44 and stored in the remote storage 20. Although illustrated separately, the network interface 44 may alternatively be the same network interface 26 used to receive the multimedia content from the content server 14. The packaged file may be transferred to the remote system 22 over a LAN or alternatively some direct wired or wireless connection. Note that during or before the transfer, the packaged media file may be temporarily stored in the local storage 42. As another alternative, the set-top box function 12 may transfer the packaged file directly to the remote storage 20. For example, the remote storage 20 may be a network device, and the set-top box function 12 may transfer the packaged multimedia file to the remote storage 20 via a LAN. As another example, the set-top box function 12 may transfer the packaged multimedia file to the remote storage directly over a direct wired or wireless connection.

If recording is not restricted, the set-top box function 12, and in this embodiment the encryption and file packaging function 40, may store the decrypted multimedia content from the decryption function 28 in the local storage 42 or, alternatively, the remote storage 20.

Notably, the decryption function 28, the decompression function 30, the HDMI/HDCP interface 32, and the encryption and file packaging function 40 are preferably, but not necessarily, implemented on a single integrated circuit (IC) 46 to prevent unauthorized access to the decrypted multimedia content. For example, the decryption function 28, the decompression function 30, the HDMI/HDCP interface 32, and the encryption and file packaging function 40 may be implemented on a single Application Specific Integrated Circuit (ASIC) or Field Programmable Gate Array (FPGA). As such, a user is unable to probe wiring or connections between the decryption function 28, the decompression function 30, the HDMI/HDCP interface 32, and the encryption and file packaging function 40 to obtain an unprotected copy of the multimedia content.

Figure 2:
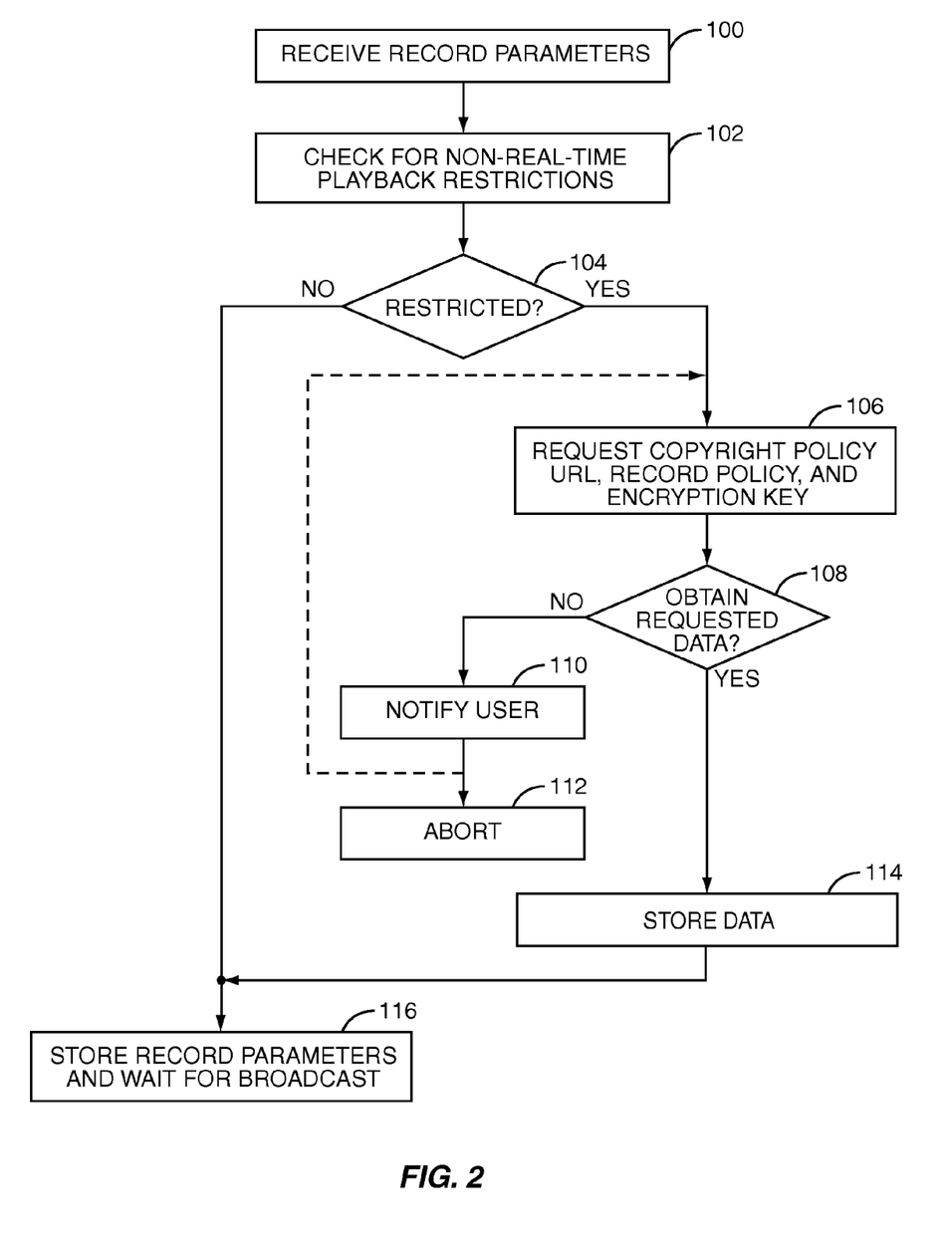
FIG. 2 illustrates the operation of the set-top box function to process a record request according to one embodiment of the present invention.

FIG. 2 illustrates the operation of the set-top box function 12 for handling a record request. The record request may be from a user interacting with the set-top box function 12. Alternatively, the user may interact with, for example, the remote system 22 such that a record request is provided to the set-top box function 12. First, the set-top box function 12 receives record parameters generally identifying the multimedia content desired to be recorded (step 100). The record parameters may include, for example, a channel, time, and date on which the desired multimedia content will be broadcast. The set-top box function 12 then checks for non-real-time playback restrictions for the desired multimedia content (step 102). The set-top box function 12 may check for non-real-time playback restrictions by examining the multimedia content to determine whether a broadcast flag is set, sending a request to the content server 14 or some associated system, or examining metadata describing the desired multimedia content provided to the set-top box function 12 as, for example, part of an EPG.

If recording is restricted (step 104), the set-top box function 12 then sends a request to the license server 18 for an encryption key to be used for re-encrypting the desired multimedia content and optionally one or more of the URL for the copyright policy server 24 and the record policy for the desired multimedia content (step 106). The request may include the content ID of the desired multimedia content and optionally the set-top ID 36 of the set-top box function 12. As mentioned above, the encryption key returned by the license server 18 may be unique to the desired multimedia content, unique to the set-top box function 12, or unique to the combination of the desired multimedia content and the set-top box function 12. The URL of the copyright policy server 24 may be used later by the remote system 22 to contact the copyright policy server 24. The record policy may include advance information regarding the steps that will be necessary to obtain non-real-time access to the multimedia content. For example, the record policy may include information stating that the user will be required to purchase the multimedia content or pay a fee before non-real-time access is permitted, information indicating the client-side watermarking will be required, or information describing a DRM policy for the multimedia content.

If the requested data is not obtained from the license server 18 (step 108), the set-top box function 12 notifies the user (step 110). The requested data may not be obtained where a network connection to the license server 18 is lost or interrupted or if the set-top box function 12 is not permitted to record the desired multimedia content for non-real-time playback. Optionally, the process may return to step 106 and repeat. At some point, if the requested data is not obtained from the license server 18, the recording process is aborted (step 112). The process may be aborted, for example, after the first time the set-top box function 12 fails to obtain the requested data from the license server 18 or after a predetermined number of iterations through steps 106-110.

Returning to step 108, if the set-top box obtains the requested data from the license server 18, the set-top box function 12 then stores the requested data (step 114). The set-top box function 12 also stores the record parameters and waits for the broadcast or multicast of the desired multimedia content (step 116).

Returning to step 104, if recording of the desired multimedia content is not restricted, the set-top box function 12 stores the record parameters and waits for the broadcast or multicast of the desired multimedia content (step 116).

Figure 3:
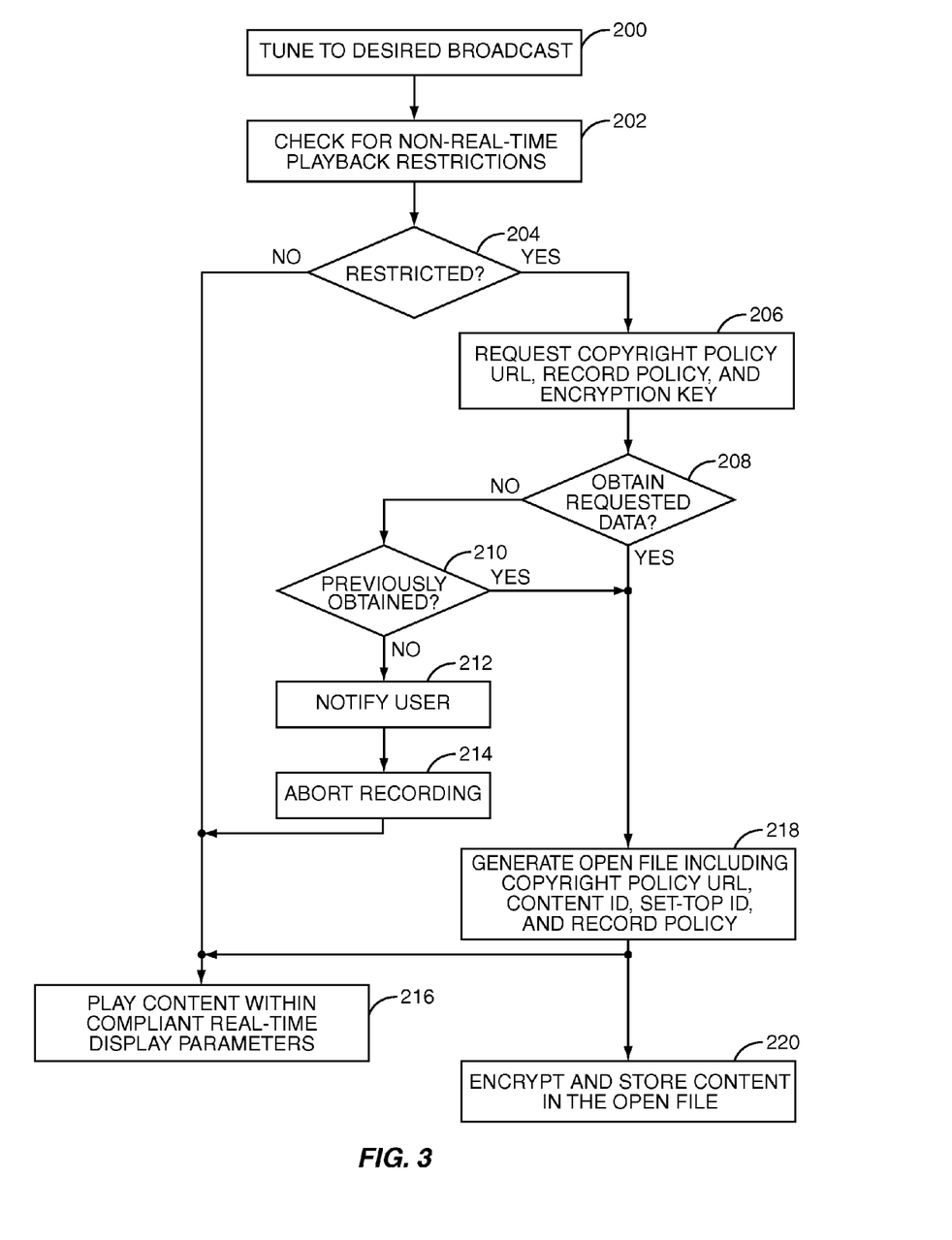
FIG. 3 illustrates the operation of the set-top box function to perform a recording process according to one embodiment of the present invention.

FIG. 3 illustrates the operation of the set-top box function 12 during reception of multimedia content desired to be recorded according to one embodiment of the present invention. Note that the process of FIG. 2 may have previously been performed when the recording of the multimedia content was initially programmed.

First, at some point prior to or at the beginning of the broadcast or multicast of the desired multimedia content, the set-top box function 12 tunes to the desired channel (step 200). As used herein, "tune" may be subscribing to the corresponding multicast channel or tuning a digital television tuner to the corresponding channel. In this example, the set-top box function 12 checks for non-real-time playback restrictions (step 202). Even though this step was also performed in the process of FIG. 2, it may be desirable here in order to determine whether the recording restrictions for the desired multimedia content have changed.

If recording is restricted (step 204), the set-top box function 12 then sends a request to the license server 18 for the encryption key to be used for re-encrypting the desired multimedia content and optionally one or more of the URL for the copyright policy server 24 and the record policy for the desired multimedia content (step 206). Like step 202, step 206 is optional. If the requested data is not obtained from the license server 18 (step 208), the set-top box function 12 determines whether the requested data has been previously obtained from the license server 18 during the process of FIG. 2 (step 210). If the requested data has not been previously obtained, the set-top box function 12 notifies the user (step 212) and aborts the recording process (step 214). The set-top box function 12 then plays the desired multimedia content within compliant real-time display parameters (step 216). More specifically, the multimedia content is decrypted, decompressed and provided to the playback device 16 via the HDMI/HDCP interface 32.

Returning to steps 208 and 210, if the set-top box function 12 obtains the requested data from the license server 18 or has previously obtained the requested data from the license server 18, the set-top box function 12 stores the requested data if necessary and generates an open file including one or more of the URL of the copyright policy server 24, the content ID of the desired multimedia content, the set-top ID 36, and the record policy of the desired multimedia content (step 218). The set-top box function 12 then re-encrypts the decrypted multimedia content from the decryption function 28 using the encryption key from the license server 18 and stores the re-encrypted multimedia content in the open file, thereby generating the packaged multimedia file (step 220). As discussed above, the packaged multimedia file may be stored locally in the local storage 42 or stored remotely in the remote storage 20. Note that if remote storage is desired, the packaged file may or may not be temporarily stored locally by the set-top box function 12 prior to transfer to the remote storage 20.

Returning to step 204, if recording of the desired multimedia content is not restricted, the set-top box function 12 plays the desired multimedia content within compliant real-time display parameters (step 216). More specifically, the multimedia is content decrypted, decompressed and provided to the playback device 16 via the HDMI/HDCP interface 32.

Figure 4:
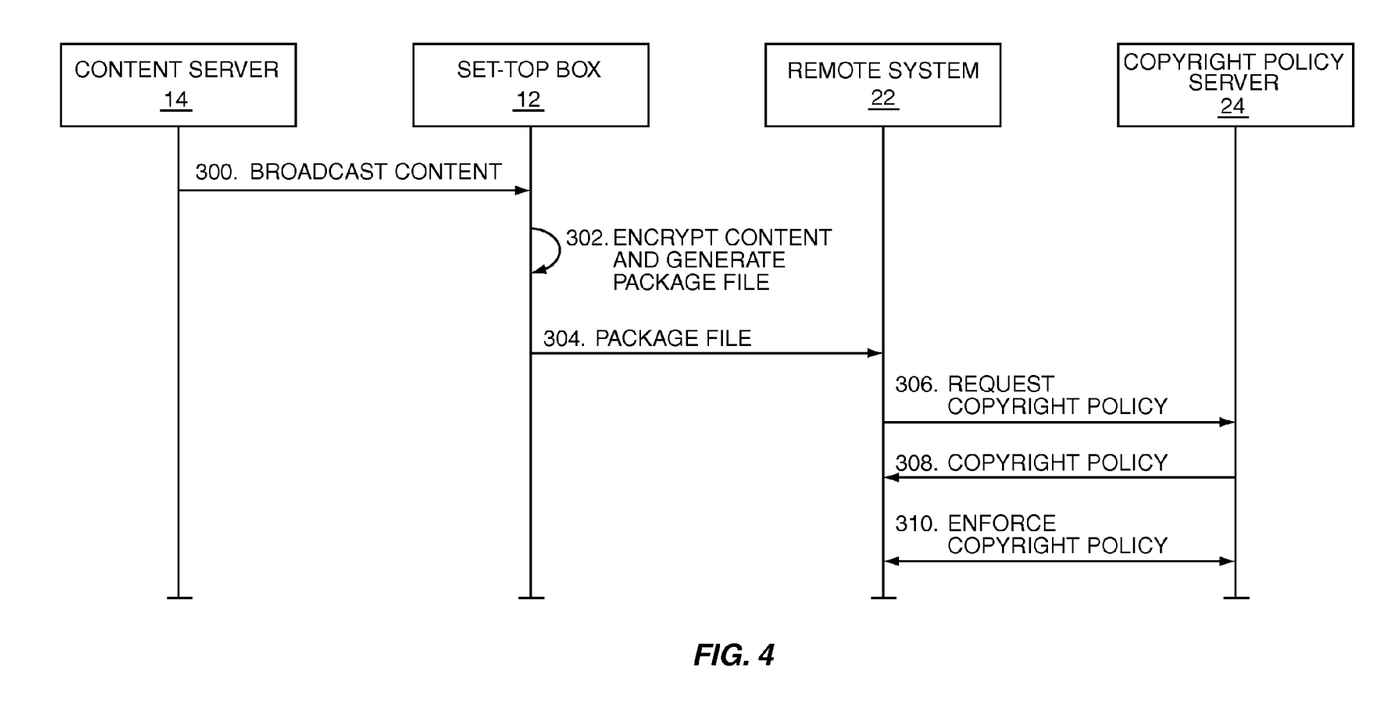
FIG. 4 illustrates the operation of the system of FIG. 1 to enforce a copyright policy of multimedia content recorded by the set-top box function according to one embodiment of the present invention.

FIG. 4 illustrates the operation of the remote system 24 to obtain the packaged multimedia file and to enforce the copyright policy for the multimedia content when releasing the multimedia content for non-real-time playback. In general, as discussed above, the content server 14 broadcasts or multicasts multimedia content to the set-top box function 12 (step 300). Assuming that recording is desired and that recording is restricted, the set-top box function 12 decrypts the multimedia content for real-time playback, re-encrypts the decrypted multimedia content with the encryption key obtained from the license server 18, and generates the packaged multimedia file (step 302). Whether the packaged multimedia file is stored locally at the set-top box function 12 or remotely in the remote storage 20, the packaged multimedia file is provided to the remote system 22 at some point (step 304).

In order to release the multimedia content for non-real-time playback, the remote system 22 requests a copyright policy for the multimedia content from the copyright policy server 24 using the URL for the copyright policy server 24 stored in the packaged multimedia file (step 306). Alternatively, the remote system 22 may already know the URL of the copyright policy server 24, in which case the URL in the packaged multimedia file is optional. In response to the request, the copyright policy server 24 returns the copyright policy for the multimedia content to the remote system 22 (step 308). The copyright policy may, for example, require client-side watermarking of the multimedia content with information identifying the multimedia content, the set-top box function 12, and/or the associated user. As another example, the copyright policy may be a DRM policy for the multimedia content. The DRM policy may be, for example, a maximum number of times that that multimedia content may be played, a maximum number of devices to which the multimedia content may be copied or on which the multimedia content may be played, or the like. In addition or alternatively, the copyright policy may require that the user purchase the multimedia content or pay a fee for non-real-time playback of the multimedia content.

Upon receiving the copyright policy, the remote system 22 and the copyright policy server 24 interact to enforce the copyright policy (step 310). Enforcing the copyright policy may include, for example, watermarking the multimedia content before releasing the multimedia content for non-real-time playback, enforcing a DRM policy, and/or conducting an e-commerce transaction during which the user purchases the multimedia content or otherwise pays for non-real-time playback of the multimedia content.

As a first example, in order to enforce the copyright policy, the copyright policy server 24 or an associated server may obtain the key for decrypting the re-encrypted multimedia content from the license server 18 and provide an executable watermarking application and the key to the remote system 22. Alternatively, the key may be embedded in the executable watermarking application or obtained by the executable watermarking application from the copyright policy server 24 or the license server 18 during execution. The remote system 22 may then run the executable watermarking application, where the executable watermarking application decrypts the re-encrypted multimedia content in the packaged multimedia file and watermarks the multimedia content with, for example, one or more of the content ID from the packaged multimedia file, the set-top ID 36 from the packaged multimedia file, and user specific information. The user specific information may include information such as the name of the user of the set-top box function 12 and/or the user of the remote system 22, a credit card number of a credit card used for an e-commerce transaction to purchase the multimedia content or pay a fee for non-real-time playback, or the like. Once the multimedia content is watermarked, the watermarked multimedia content may be released and stored for non-real-time playback by the remote system 22 and/or the set-top box function 12. Still further, the watermarked multimedia content 12 may be transferred to the set-top box function 12 and stored locally in the local storage 42.

In another embodiment, the executable watermarking application may watermark the multimedia content with information identifying the user such as the set-top ID 36 and/or the user information and with information identifying the content such as the content ID and/or information identifying the content owner. These watermarks can be said to be a content specific watermark and a user specific watermark. The copyright policy server 24 may provide a digital certificate including information corresponding to the content specific watermark and the user specific watermark, wherein access to the watermarked multimedia content may be controlled based on a comparison of the digital certificate and the watermarks in the multimedia content. For example, full access may be provided if the information in the digital certificate matches both the content specific watermark and the user specific watermark. Limited access may be provided if the digital certificate matches only the content specific watermark. As such, if the user loses the watermarked multimedia content, the user may obtain another copy of the watermarked multimedia content and still have limited access. For more information, the interested user is directed to U.S. patent application Ser. No. 11/565,013, entitled MULTIPLE WATERMARKS FOR DIGITAL RIGHTS MANAGEMENT (DRM) AND CONTENT TRACKING, which was filed on Nov. 30, 2006 and is hereby incorporated by reference in its entirety.

As another example, client-side watermarking may be performed in a manner similar to that discussed above. However, in this example, the copyright policy server 24 may provide a unique ID to be used for client-side watermarking. The unique ID may be stored in a remote database associated with the copyright policy server 24. In order to identify the user, the set-top ID 36 and/or user specific information is provided to the copyright policy server 24 and stored in the database in association with the unique ID used for watermarking.

As another example, the remote system 22 may provide the re-encrypted multimedia content to the copyright policy server 24 or associated system. The copyright policy server 24 or associated system may then generate an executable package including the re-encrypted multimedia content and the key for decrypting the re-encrypted multimedia content. The executable package is returned to the remote system 22. Upon execution, the executable package forces client-side watermarking of the multimedia content before the multimedia content is released for storage and non-real-time playback. For more information, the interested reader is directed to U.S. patent application Ser. No. 11/554,317, entitled EXECUTABLE PACKAGE FORCING WATERMARKING OF EMBEDDED DIGITAL MEDIA CONTENT, which was filed on Oct. 30, 2006 and is hereby incorporated by reference in its entirety.

As a final example, the multimedia content may be compressed according to MPEG2, MPEG4, H.264, or the like. In addition to the multimedia content, the set-top box function 12 may receive a number of hybrid I-Frames (or I-Slices), where the hybrid I-Frames are low-loss versions of one or more of the I-Frames in the multimedia content stream. In this example, the hybrid I-Frames are also encrypted and stored in the packaged multimedia file. Then, in order to watermark the multimedia content, the hybrid I-Frames are watermarked and used to replace the corresponding I-Frames in the multimedia content stream. Watermarking may be performed by an executable watermarking application provided by the copyright policy server 24 or by an executable package having the encrypted multimedia content and hybrid I-Frames embedded therein in a manner similar to that described above. For more information, the interested reader is directed to U.S. patent application Ser. No. 11/555,707, entitled CLIENT-SIDE WATERMARKING USING HYBRID I-FRAMES, filed on Nov. 2, 2006 and U.S. patent application Ser. No. 11/555,709, entitled SELECTION OF I-FRAMES FOR CLIENT-SIDE WATERMARKING, filed on Nov. 2, 2006, which are hereby incorporated by reference in their entireties.

Those skilled in the art will recognize improvements and modifications to the preferred embodiments of the present invention. All such improvements and modifications are considered within the scope of the concepts disclosed herein and the claims that follow.

What is claimed is:

1. A system comprising:
 a) a control system adapted to:
  i) receive a request to record multimedia content; and
  ii) determine whether recording of the multimedia content is restricted;
 b) a network interface adapted to:
  i) receive the multimedia content from a content server; and
  ii) receive a plurality of hybrid I-Frames that are low-loss versions of a corresponding subset of I-Frames of the multimedia content;
 c) a decryption function adapted to decrypt the multimedia content to provide decrypted multimedia content for real-time playback; and
 d) an encryption function adapted to, if recording of the multimedia content is restricted:
  i) re-encrypt the decrypted multimedia content to provide re-encrypted multimedia content; and
  ii) store the re-encrypted multimedia content, wherein a separate system obtains the re-encrypted multimedia content and enforces a rights policy of the multimedia content before releasing the multimedia content for non-real-time playback.

2. The system of claim 1 wherein if recording of the multimedia content is not restricted, the control system is further adapted to effect storage of the decrypted multimedia content for non-real-time playback.

3. The system of claim 1 further comprising:
 a decompression function adapted to decompress the decrypted multimedia content to provide decrypted, decompressed multimedia content; and
 a secure digital interface adapted to provide the decrypted, decompressed multimedia content to a compliant playback device for real-time playback.

4. The system of claim 3 wherein the secure digital interface is a High-bandwidth Digital Content Protection (HDCP) compliant High Definition Multimedia Interface (HDMI).

5. The system of claim 3 wherein the decryption function, the encryption function, and the decompression function are implemented on a single integrated circuit.

6. The system of claim 3 wherein the decryption function, the encryption function, the decompression function, and the secure digital interface are implemented on a single integrated circuit.

7. The system of claim 1 wherein if recording of the multimedia content is restricted, the control system is further adapted to:
 obtain an encryption key for the multimedia content from a license server; and
 provide the encryption key to the encryption function, wherein the encryption function re-encrypts the decrypted multimedia content using the encryption key from the license server.

8. The system of claim 7 wherein the encryption key is unique to one of a group consisting of: the system, the multimedia content, and a combination of the system and the multimedia content.

9. The system of claim 7 wherein:
 the encryption function is further adapted to store identification information comprising at least one of a group consisting of: information identifying the multimedia content and information identifying the system, and
 in order to obtain the encryption key from the license server, the control system is further adapted to provide a request including the identification information to the license server and receive the encryption key from the license server.

10. The system of claim 1 wherein the encryption function is further adapted to generate a packaged file including the re-encrypted multimedia content and associated information comprising at least one of a group consisting of: information identifying the multimedia content, information identifying the system, and a network reference of a rights policy server hosting the rights policy of the multimedia content, wherein the separate system obtains the packaged file, obtains the rights policy using the associated information, and enforces the rights policy of the multimedia content before releasing the multimedia content for non-real-time playback.

11. The system of claim 10 wherein the packaged file is stored locally by the system.

12. The system of claim 10 wherein the packaged file is stored remotely in remote storage associated with the separate system.

13. The system of claim 1 wherein the encryption function is further adapted to store information identifying the multimedia content in association with the re-encrypted multimedia content, and the separate system is adapted to:
  obtain the re-encrypted multimedia content;
  obtain the rights policy for the multimedia content from a rights policy server based on the information identifying the multimedia content; and
  effect enforcement of the rights policy of the multimedia content before releasing the multimedia content for non-real-time playback.

14. The system of claim 13 wherein the rights policy requires watermarking of the multimedia content, and the separate system enforces the rights policy by effecting watermarking of the multimedia content with at least one of a group consisting of the information identifying the multimedia content, information identifying the system, and information identifying an associated user.

15. The system of claim 13 wherein the rights policy requires watermarking of the multimedia content, and in order to effect enforcement of the rights policy, the separate system is further adapted to:
  effect watermarking of the multimedia content with a content specific watermark comprising the information identifying the multimedia content and a user specific watermark to provide watermarked multimedia content; and
  obtain a digital certificate comprising content specific watermark information corresponding to the content specific watermark and user specific watermark information corresponding to the user specific watermark from the rights policy server;
  wherein access to the watermarked multimedia content is controlled based on a comparison of the content specific and user specific watermarks to the content specific and user specific watermark information in the digital certificate.

16. The system of claim 13 wherein the rights policy requires watermarking of the multimedia content, and in order to effect enforcement of the rights policy, the separate system is further adapted to:
  obtain a watermarking application from a remote source; and
  execute the watermarking application to effect watermarking of the multimedia content with at least one of a group consisting of: the information identifying the multimedia content, information identifying the system, and information identifying an associated user.

17. The system of claim 16 wherein the executable watermarking application instructs the separate system to obtain a decryption key for the re-encrypted multimedia content from the rights policy server, decrypt the re-encrypted multimedia content using the decryption key, and watermark the multimedia content.

18. The system of claim 16 wherein the executable watermarking application has a decryption key for decrypting the re-encrypted multimedia content embedded therein and instructs the separate system to decrypt the re-encrypted multimedia content using the decryption key and watermark the multimedia content.

19. The system of claim 13 wherein the rights policy requires watermarking of the multimedia content, and in order to effect enforcement of the rights policy, the separate system is further adapted to:
  provide the re-encrypted multimedia content to the rights policy server; and
  in response, receive an executable package having the re-encrypted multimedia content embedded therein, the executable package forcing watermarking of the multimedia content with at least one of a group consisting of: the information identifying the multimedia content, information identifying the system, and information identifying an associated user.

20. The system of claim 19 wherein upon execution, the executable package instructs the separate system to obtain a decryption key for the re-encrypted multimedia content from the rights policy server, decrypt the re-encrypted multimedia content using the decryption key, and watermark the multimedia content.

21. The system of claim 19 wherein the executable package further includes a decryption key for decrypting the re-encrypted multimedia content and instructs the separate system to decrypt the re-encrypted multimedia content using the decryption key and watermark the multimedia content.

22. The system of claim 13 wherein the rights policy requires purchase of the multimedia content, and the separate system enforces the rights policy by effecting an e-commerce transaction during which the multimedia content is purchased by an associated user.

23. The system of claim 13 wherein the rights policy requires payment of a fee for non-real-time playback of the multimedia content, and the separate system enforces the rights policy by effecting an e-commerce transaction during which the fee is paid by an associated user.

24. The system of claim 13 wherein the rights policy is a Digital Rights Management (DRM) policy, and the separate system enforces the DRM policy when releasing the multimedia content for non-real-time playback.

25. The system of claim 13 wherein the associated information further comprises a network reference to the rights policy server.

26. The system of claim 1 wherein the multimedia content is broadcast from the content server to a plurality of systems including the system.

27. The system of claim 1 wherein the multimedia content is multicast from the content server to a plurality of systems including the system.

28. The system of claim 1 wherein the system is a set-top box function.

29. A method comprising:
  receiving a request to record multimedia content;
  determining whether recording of the multimedia content is restricted;
  receiving the multimedia content from a content server;

receiving a plurality of hybrid I-Frames that are low-loss versions of a corresponding subset of I-Frames of the multimedia content;

decrypting the multimedia content to provide decrypted multimedia content for real-time playback; and if recording of the multimedia content is restricted, re-encrypting the decrypted multimedia content to provide re-encrypted multimedia content and storing the re-encrypted multimedia content;

wherein a separate system obtains the re-encrypted multimedia content and enforces a rights policy of the multimedia content before releasing the multimedia content for non-real-time playback.

* * * * *

UNITED STATES PATENT AND TRADEMARK OFFICE
CERTIFICATE OF CORRECTION

| | | |
|---|---|---|
| PATENT NO. | : 8,000,474 B1 | Page 1 of 1 |
| APPLICATION NO. | : 11/611188 | |
| DATED | : August 16, 2011 | |
| INVENTOR(S) | : Gregory Morgan Evans et al. | |

It is certified that error appears in the above-identified patent and that said Letters Patent is hereby corrected as shown below:

On the cover page item (73), change the Assignee's name from "Quiro" to --Qurio--.

Signed and Sealed this
Twenty-seventh Day of September, 2011

David J. Kappos
*Director of the United States Patent and Trademark Office*